(12) United States Patent
Susca et al.

(10) Patent No.: US 8,467,612 B2
(45) Date of Patent: Jun. 18, 2013

(54) SYSTEM AND METHODS FOR NAVIGATION USING CORRESPONDING LINE FEATURES

(75) Inventors: Sara Susca, Minneapolis, MN (US); Kailash Krishnaswamy, Little Canada, MN (US)

(73) Assignee: Honeywell International Inc., Morristown, NJ (US)

( * ) Notice: Subject to any disclaimer, the term of this patent is extended or adjusted under 35 U.S.C. 154(b) by 1257 days.

(21) Appl. No.: 12/250,457

(22) Filed: Oct. 13, 2008

(65) Prior Publication Data
US 2010/0092071 A1   Apr. 15, 2010

(51) Int. Cl.
*G06K 9/46* (2006.01)
*G06K 9/00* (2006.01)
*G06T 15/00* (2011.01)

(52) U.S. Cl.
USPC ........... 382/202; 382/154; 382/190; 382/192; 382/195; 382/203; 345/419

(58) Field of Classification Search
USPC ................. 382/190, 192, 193, 202, 203, 154, 382/195; 345/419
See application file for complete search history.

(56) References Cited

U.S. PATENT DOCUMENTS

| 6,718,062 | B1   | 4/2004 | Zhang et al.        |         |
|-----------|------|--------|---------------------|---------|
| 6,888,960 | B2   | 5/2005 | Penev et al.        |         |
| 7,535,460 | B2 * | 5/2009 | Momose ............. | 345/173 |
| 7,656,424 | B2 * | 2/2010 | Bouzar ............. | 348/149 |
| 2007/0127816 | A1 * | 6/2007 | Balslev et al. ......... | 382/181 |
| 2009/0022365 | A1 * | 1/2009 | Kotake ................ | 382/103 |
| 2009/0279740 | A1 * | 11/2009 | Yamazaki ........... | 382/106 |
| 2009/0324093 | A1 * | 12/2009 | Miarecki et al. ...... | 382/203 |

FOREIGN PATENT DOCUMENTS

| EP | 0364353 | 4/1990 |
|----|---------|--------|
| EP | 1975646 | 10/2008 |

OTHER PUBLICATIONS

Stamos et al., "Automated feature-based range registration of urban scenes of large scale," Computer Vision and Pattern Recognition, 2003. Proceedings. 2003 IEEE Computer Society Conference on, vol. 2, No., pp. II-555-Ii-561 vol. 2, Jun. 18-20, 2003.*
Chao., "Semi-automatic range to range registration: a feature-based method," 3-D Digital Imaging and Modeling, 2005. 3DIM 2005. Fifth International Conference on, vol., No., pp. 254- 261, Jun. 13-16, 2005.*
European Patent Office, "European Search Report", Feb. 26, 2010, Published in: EP.
Matsuyama et al., "Structural Matching of Line Drawings Using the Geometric Relationship Between Line Segments", "Computer Vision, Graphics, and Image Processing", 1984, pp. 177-194, vol. 27.

(Continued)

*Primary Examiner* — Anand Bhatnagar
*Assistant Examiner* — Soo Park
(74) *Attorney, Agent, or Firm* — Fogg & Powers LLC (57) ABSTRACT

A method for navigating identifies line features in a first three-dimensional (3-D) image and a second 3-D image as a navigation platform traverses an area and compares the line features in the first 3-D image that correspond to the line features in the second 3-D image. When the lines features compared in the first and the second 3-D images are within a prescribed tolerance threshold, the method uses a conditional set of geometrical criteria to determine whether the line features in the first 3-D image match the corresponding line features in the second 3-D image.

11 Claims, 7 Drawing Sheets

OTHER PUBLICATIONS

Uijt De Haag et al., "Implementation of a Flash-Ladar Aided Inertial Navigator", "Position, Location and Navigation Symposium 2008 IEEE/ION", May 5, 2008, pp. 560-567, Publisher: IEEE, Published in: Piscataway, NJ, USA.

Chen, Homer and Thomas Huang, "Matching 3-D Line Segments with Applicaiton to Multiple-Object Motion Estimation", "IEEE Transactions on Pattern Analysis and Machine Intelligence", Oct. 1990, pp. 1002-1008, vol. 12, No. 10, Publisher: IEEE.

Kamgar-Parsi, B. et al., "Algorithms for Matching 3D Line Sets", "IEEE Transactions on Pattern Analysis and Machine Intelligence", May 2004, pp. 582-593, vol. 26, No. 5, Publisher: IEEE.

Kamgar-Parsi, B. et al., "Matching Sets of 3D Line Segments with Application to Polygonal Arc Matching", "IEEE Transactions on Pattern Analysis and Machine Intelligence", Oct. 1997, pp. 1090-1099, vol. 19, No. 10, Publisher: IEEE.

Ko, San, "Structural Object Recognition Using Entropy Correspondence Measure of Line Features", "IEICE Trans. Inf. & Syst.", Jan. 2008, pp. 78-85, vol. E91-D, No. 1, Publisher: The Institute of Electronics, Information and Communication Engineers.

Sull, S., "Integrated Matching and Segmentation of Multiple Features in Two Views", "Computer Vision and Image Understanding", Nov. 1995, pp. 279-297, vol. 62, No. 3, Publisher: Academic Press Inc.

Israel Patent Office, "Office Action", "from Foreign Counterpart of U.S. Appl. No. 12/250,457", Nov. 28, 2012, pp. 1-6, Published in: IL.

* cited by examiner

SYSTEM AND METHODS FOR NAVIGATION USING CORRESPONDING LINE FEATURES

BACKGROUND

Navigation in the absence of global positioning systems (GPS) is an area receiving much attention from both military and commercial sectors. Typically, existing solutions that address this type of navigation provide relative navigation (that is, relative to a current position of a navigation platform) by dead reckoning.

In dead reckoning, the navigation platform finds a current position by measuring a course and a distance the platform has moved from some known point. Starting from the known point, the platform measures out the course and the distance from that point, and each ending position will be the starting point for the next course and distance measurement. The platform will then derive a position estimate from an integration of distance and direction over a sequence of steps. This type of navigation, however, is susceptible to navigation drift, which when compounded leads to highly inaccurate position and distance estimates.

Currently, in order to reduce the drift in the dead-reckoning measurements, the navigation platform will employ navigational-aiding sensors to provide images of an area under navigation and navigate from specific features within the area. However, matching one or more sets of these specific features from any overlapping images captured over multiple periods is still susceptible to errors.

SUMMARY

The following specification provides for a system and methods for navigation using corresponding line features. Particularly, in one embodiment, a method for navigating identifies line features in a first three-dimensional (3-D) image and a second 3-D image as a navigation platform traverses an area and compares the line features in the first 3-D image that correspond to the line features in the second 3-D image. When the lines features compared in the first and the second 3-D images are within a prescribed tolerance threshold, the method uses a conditional set of geometrical criteria to determine whether the line features in the first 3-D image match the corresponding line features in the second 3-D image.

BRIEF DESCRIPTION OF THE DRAWINGS

The various described elements are drawn to emphasize elements relevant to the embodiments disclosed. Like reference characters denote like elements throughout the figures and text of the specification.

DETAILED DESCRIPTION

Embodiments disclosed herein relate to a system and methods for navigation using corresponding line features. For example, at least one embodiment relates to matching the corresponding line features from a plurality of images recorded by a system for navigation at particular intervals of time. Moreover, these corresponding line features are matched independent of a current position of the system using a set of conditional geometrical criteria independent of any navigation-aiding motion estimation techniques.

For purposes of this description, a line feature is any feature within the images where at least two planes intersect to form a line segment or a difference in texture exists between different parts of a surface. These line features provide a three-dimensional (3-D) view of the images for navigating in any number of environments. In particular, dense urban areas and indoor environments are well suited for the system and methods for navigation discussed herein.

In one embodiment, corresponding sets of the line features are defined by an interline angle measurement or an interline distance measurement between a pair of line segments. For purposes of this description, an interline angle is the angle between a first line segment and the projection of a second line segment on a plane passing through the first line segment that is parallel to the second line segment. The interline distance is the shortest distance between any two line segments based on a Euclidean metric (as discussed in further detail below). The interline angle and the interline distance between corresponding line segments remain constant under any rotation and translation of a particular host platform for the system between frames having the recorded images. This particular host platform includes, but is not limited to, an aircraft, an automobile, a person, or any other navigation platform for navigating using corresponding line features as discussed herein.

Figure 1:
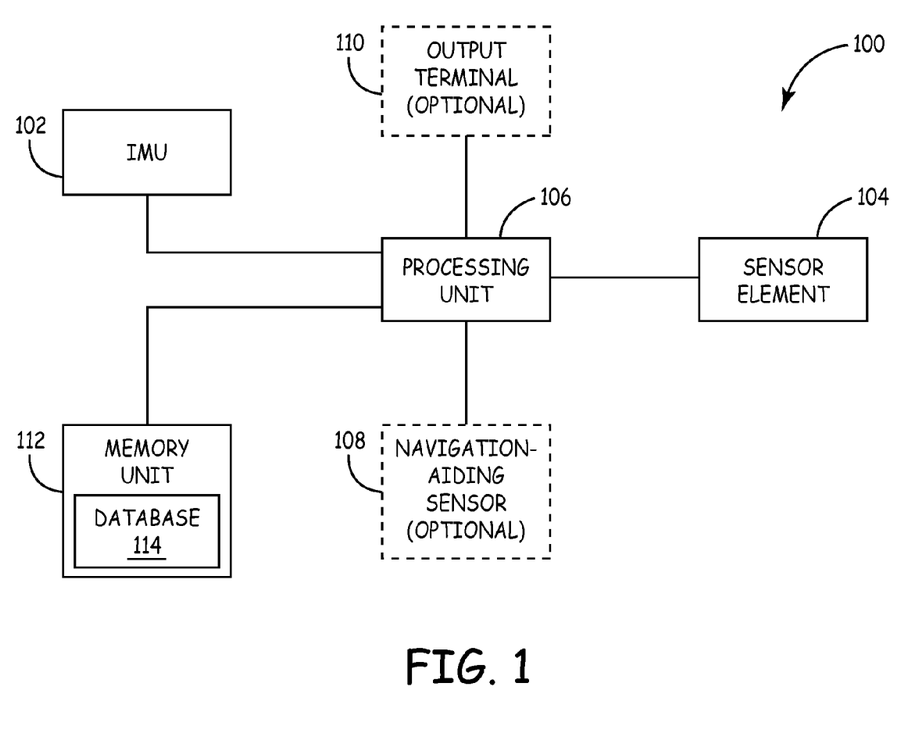
FIG. 1 is a block diagram of an embodiment of a system for navigation.

FIG. 1 is a block diagram of an embodiment of a system 100 for navigation. The system 100 comprises at least a processing unit 106, a memory unit 112, an inertial measurement unit (IMU) 102, and a sensor element 104. The sensor element 104 and the IMU 102 are each coupled to the processing unit 106 and provide input data to the processing unit 106 for estimating motion of the system 100 (for example, position, velocity, or any suitable combination thereof). The memory unit 112 includes a database 114 in operative communication with the processing unit 106. The system 100 further comprises an optional navigation-aiding sensor 108 and an optional output terminal 110, each of which are communicatively coupled to the processing unit 106. In one implementation, the optional navigation-aiding sensor 108 includes one or more of a global positioning system (GPS) sensor, a magnetometer, a barometric altimeter, a Doppler radar, an odometer, and any other suitable navigation-aiding sensor or sensor element.

The IMU 102 includes sensors to measure acceleration along three orthogonal coordinate axes and angular acceleration about each of the three orthogonal coordinate axes. For example, the IMU 102 comprises, but is not limited to, up to three linear accelerometers configured to obtain acceleration along the three coordinate axes, and up to three gyroscopes to measure angular rate about the same three coordinate axes. In other words, the gyroscope measurements are used to estimate attitude or orientation of the host platform, and the accelerometer measurements are used to estimate position and velocity, including the effects of gravity. As described in further detail below, the processing unit 106 determines an absolute orientation (position) of the system 100 based on the motion measured by the IMU 102.

The sensor element 104 transmits a signal (for example, a laser) out to a plurality of line features of at least one object, as further discussed below with respect to FIGS. 2A and 2B. In one implementation, the sensor element 104 is at least one of a vision sensor, range finder, stereo camera, millimeter wave radar, or ladar (laser detection and ranging). It is understood that the sensor element 104 is suitable for implementation in any appropriate manner for emitting or receiving a signal. For example, the sensor element 104 embodied as the range finder measures the distance from the range finder in the host platform to the line features by emitting light in a particular (for example, a horizontal) direction. The time for the light to travel out to the object and back to the range finder is used to determine the range to the object. Similarly, the sensor element 104 embodied as the ladar measures the distance from the ladar to the object by emitting light in multiple directions at substantially the same time.

In a similar implementation, the sensor element 104 is used concurrently with the navigation-aiding sensor 108. For example, when the navigation-aiding sensor 108 is embodied as the GPS sensor, the sensor element 104 can be used whenever a GPS satellite signal is unavailable or concurrently with the GPS sensor regardless of availability of a GPS satellite signal. Alternatively, the navigation-aiding sensor 108 is omitted in some embodiments. In such embodiments, data from the IMU 102 is only updated with measurements from the sensor element 104.

The processing unit 106 comprises a plurality of computer program product instructions for carrying out the various process tasks, calculations, and generation of signals and other data used in the operation of the system 100 (for example, to match corresponding line features between the images recorded by the sensor element 104). In some embodiments, the calculated position based on the IMU data from the IMU 102 is combined with the calculated position from the sensor element 104. In other embodiments, the calculated position from the sensor element 104 is used in place of the calculated position based on the IMU data from the IMU 102. In such embodiments, the processing unit 106 estimates any motion of the system 100 based on a plurality of scans captured by the sensor element 104. It is understood that the plurality of scans discussed herein refer to at least one of a plurality of line, range, or flash scans.

In operation, the sensor element 104 measures, within a first frame, the line features of the object in a field of view of the system 100 at a first time and within at least one second frame at a second time. The IMU 102 obtains navigational data at the first and second times. In one embodiment, the processing unit 106 estimates the position and motion of the system 100 within the first and second times based on the navigational data received from at least one of the navigation-aiding sensor 108, the IMU 102, and the sensor element 104. The memory unit 112 records navigational properties of the line features in the at least one second frame based at least in part on the navigational data from the IMU 102. In at least one similar embodiment, the memory unit 112 stores 3-D images in the database 114 based on the line features obtained at the first and second times by the sensor element 104. In addition, the processing unit 106 uses the sensor element 104 to correct and update the line features stored in the database 114 based on IMU data from the IMU 102.

In one implementation, the processing unit 106 combines the estimated position from the IMU 102 and the sensor element 104 to obtain a more accurate motion estimate. For example, the processing unit 106 identifies a first line feature of the object in the first frame, selects a second line feature corresponding to the first line feature in the second frame based on the motion data from the IMU 102, and evaluates the first and the second frames to match the corresponding line features in the second frame. The processing unit 106 matches the line features from the first frame with each of the corresponding line features in the second frame using one of an interline angle or an interline distance between at least two line segments from the first frame.

In one embodiment, the output terminal 110 displays the image features of any objects present in the field of view of the sensor element 104, and displays a current navigational state and position of the system 100 based on signals received from the processing unit 106. In some embodiments, the object recognition is (optionally) obtained from the output terminal 110. For example, an automobile using the system 100 (as the host platform) will use navigation data provided by the output terminal 110 to display to a driver of the automobile where the automobile is located on a map. In other embodiments, the processing unit 106 uses the methods for navigation discussed herein to determine the necessary actions to take in order to reach a programmed destination.

Figure 2A:
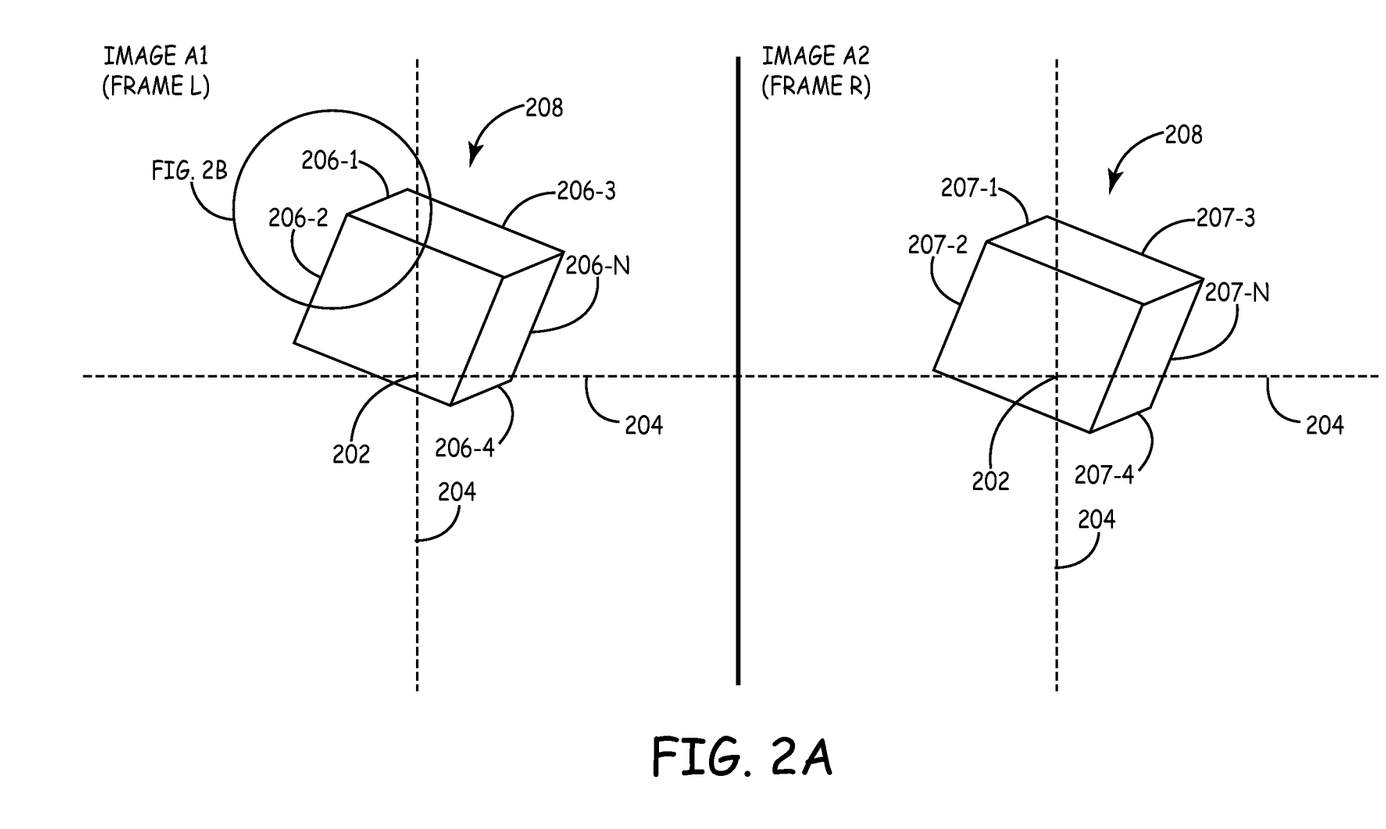
FIGS. 2A and 2B depict a model of an embodiment of using corresponding line features for navigation.
Figure 2B:
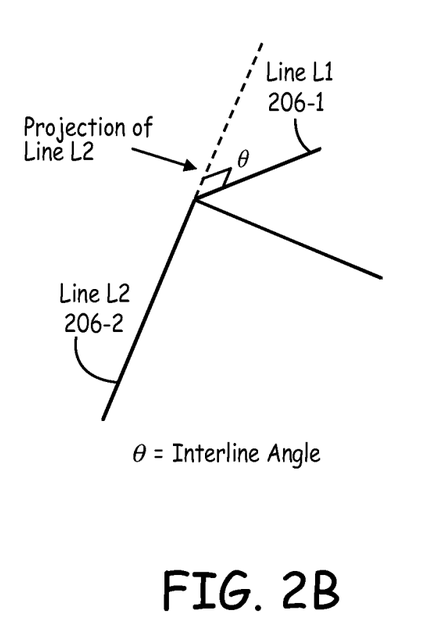

FIG. 2A is a model of an embodiment of an object 208 detected by the system 100 using corresponding line features. For example, as shown in FIG. 2A, the sensor element 104 of FIG. 1 captures a first image A1 in frame L at time T1 and a second image A2 in frame R at time T2. The first image A1 and the second image A2 are provided by way of explanation and not by way of limitation. It is to be understood that the object 208, the first image A1, and the second image A2 will vary in orientation depending on the location of the system 100 with respect to the object 208. In addition, although the object 208 is shown as a 3-D rectangle in FIG. 2A, it is to be understood that the shape of the object 208 is representative of the shape of any appropriate landmark(s) or object(s) from which corresponding line features are determined, and is not intended to limit the shape or content of any objects or images described herein, but merely provides an illustrative example.

The line features of the object 208, as described herein, refer to one or more 3-D geometric entities (for example, any particular elevational lines, contours, planes, or surface segments) discovered in the first and second images A1 and A2. For example, in one embodiment, any corresponding line features between the frame L and the frame R are determined using an interline angle to match corresponding pairs of line segments from the first image A1 at time T1 to the second image A2 at time T2. In a similar embodiment, an interline distance is used for matching corresponding line features between the first image A1 and the second image A2.

In the example embodiment of FIG. 2A, the object 208 comprises a plurality of first line segments 206-1 to 206-N in the frame L, and a plurality of second line segments 207-1 to 207-N in the frame R corresponding to the first line segments 206-1 to 206-N. Also shown in each of the images A1 and A2 is a center point 202 and coordinate axes 204. The center point 202 and the coordinate axes 204 are provided for purposes of explanation, but are not necessary for operation. In particular, the coordinate axes 204 demonstrate the relative position of the object 208 in each of the images A1 and A2 with respect to the center point 202.

In operation, the sensor element 104 obtains the image A1 at the time T1 and the image A2 at the time T2. As illustrated in FIG. 2A, the object 208 is offset differently from the center 202 between the image A1 and the image A2. In one implementation, once the images A1 and A2 are captured, the processing unit 106 of FIG. 1 locates the line segments 206-1 to 206-N (207-1 to 207-N) in each of the images A1 and A2.

Once the line segments 206-1 to 206-N (207-1 to 207-N) are located, the processing unit 106 matches each of the line segments 206 in the image A1 with the corresponding line segments 207 in the image A2. For example, the processing unit 106 matches the location of the line segment 206-1 in the image A1 with the location of the line segment 207-1 in the image A2.

To further describe the model provided in FIG. 2A, the line segment 206-1 will be given a caption of line 'L1' and the line segment 206-2 the caption of line 'L2.' Moreover, the line segment 207-1 will be given a caption of line 'R1' and the line segment 207-2 the caption of line 'R2.' In one implementation, for every line L1 extracted in the frame L, the line L2 is the closest line to the line L1 among all the line segments extracted in the frame L according to an Euclidean metric (for example, the interline distance between any of the line segments 206 and 207, proven by repeated applications of the Pythagorean theorem). Accordingly, the system 100 determines one of an interline angle or the interline distance for every pair of lines L1 and L2. As shown in FIG. 2B, the interline angle Θ is the angle between L1 and the projection of L2 on a plane passing through L1 that is parallel to L2.

In the example embodiment of FIGS. 2A and 2B, the lines L1 and L2 of frame L are considered to match the lines R1 and R2 of frame R when the difference of the interline angle between the lines L1 and L2 and the interline angle between the lines R1 and R2 is less than or equal to a prescribed tolerance threshold for the interline angle, as discussed in further detail below with respect to FIG. 3. In addition, once the corresponding line features are determined between the lines L1 and L2 and the lines R1 and R2, establishing which of the lines R1 and R2 corresponds to L1 and which of the lines R1 and R2 correspond to L2 is accomplished by using at least a third line segment 206 (207). In particular, this third line segment 206 (207) is adjacent to an area surrounding the set of lines L1 and L2 (R1 and R2). In the model provided by FIG. 2A, the line segment 206-3 will be given a caption of line 'L3' and the line segment 207-3 the caption of line 'R3' to serve this purpose. For example, the pair of intersecting line segments having an interline angle of R1R3 that matches the line segment pair having an interline angle of L1L3 provides the desired correspondence of line features between R1L1 and R2L2.

When the lines L1 and L2 are non-intersecting line segments, the interline distance is used to match the pair of line segments as discussed in further detail below with respect to FIG. 4.

Intersecting and Non-Intersecting Line Segments

The model described above involves at least one implementation of determining matching line segments for both intersecting and non-intersecting line segments. FIG. 3 is a flow diagram of an embodiment of a method 300 of matching intersecting line segments of the corresponding line features in the model of FIG. 2A, and FIG. 4 is a flow diagram of an embodiment of a method 400 of matching non-intersecting line segments of the corresponding line features in the model of FIG. 2A. In particular, the method 300 (400) addresses determining intersecting (non-intersecting) lines features from a plurality of 3-D image frames recorded by the system 100 of FIG. 1. Each of the methods shown in FIGS. 3 and 4 identify one or more pairs of line segments between a first frame and a second frame of a recorded image as the system 100 traverses an area, and select corresponding line features from the one or more pairs of line segments identified between the first and the second frames based on a prescribed tolerance threshold for the corresponding line features.

Figure 3:
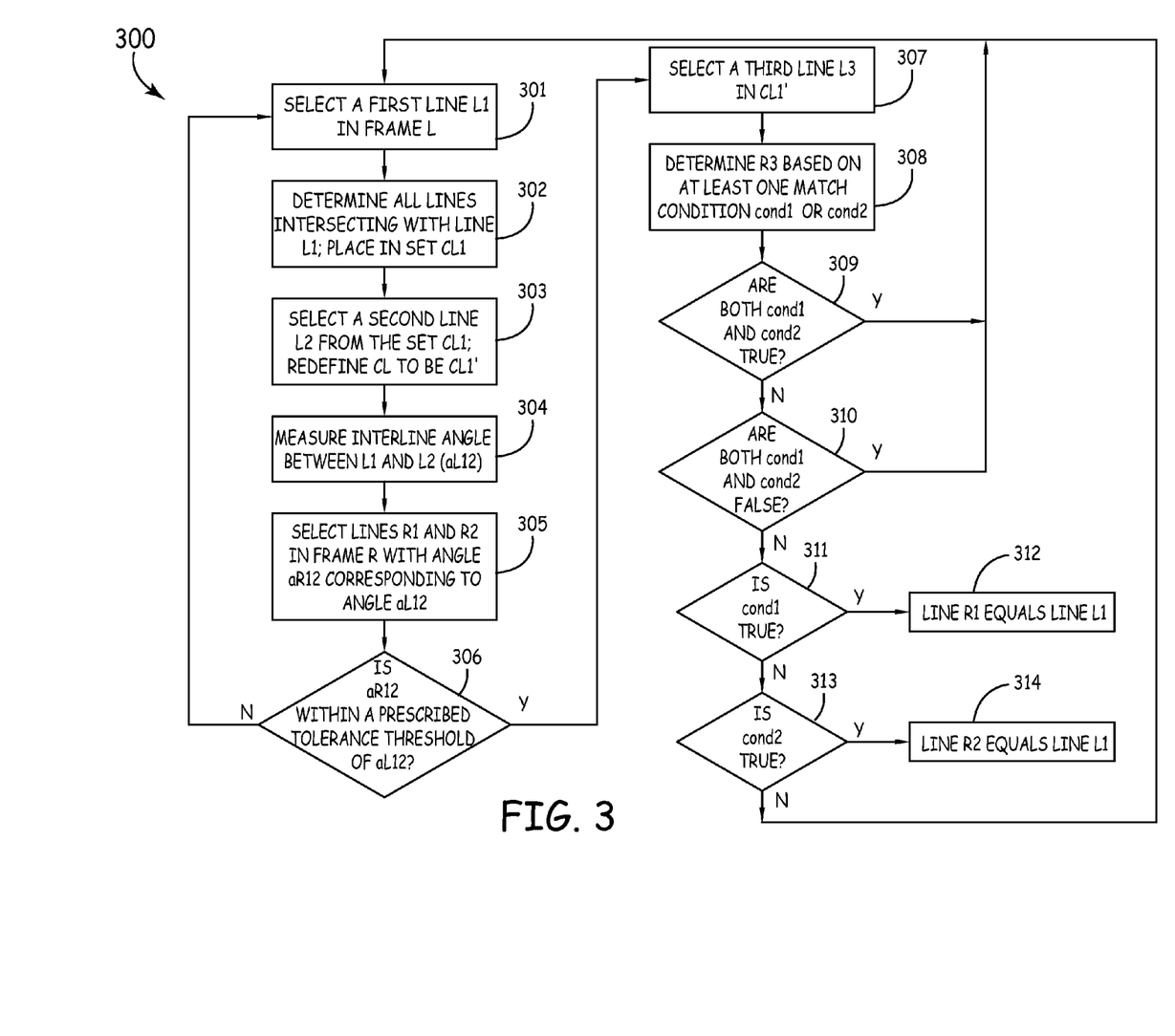
FIG. 3 is a flow diagram of an embodiment of a method of matching intersecting line segments of the corresponding line features in the model of FIG. 2A.
Figure 4:
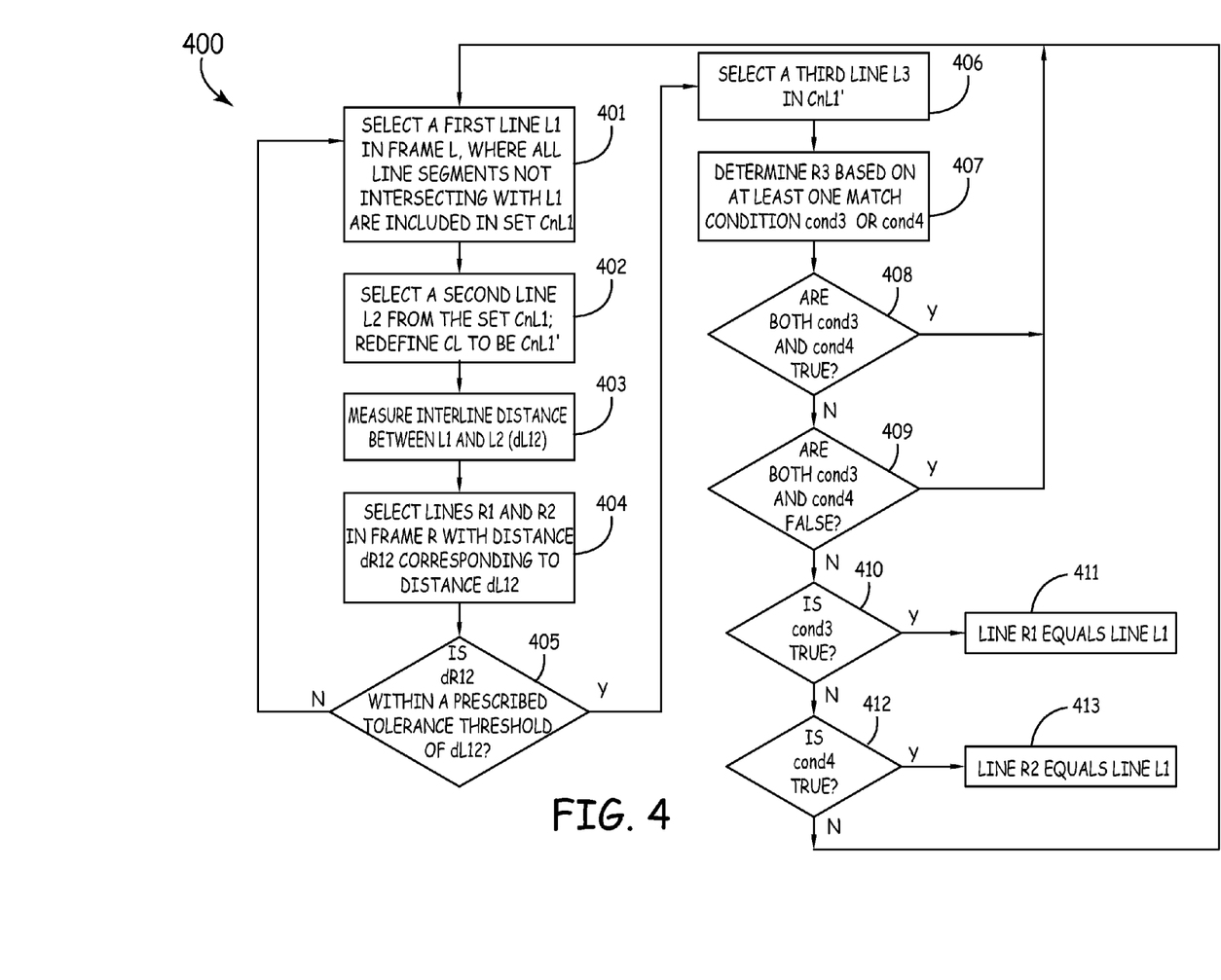
FIG. 4 is a flow diagram of an embodiment of a method of matching non-intersecting line segments of the corresponding line features in the model of FIG. 2A.

To further aid in the description of the line segment matching described as shown in FIGS. 3 and 4, the following description of nomenclature is provided below:

Xy, Xz represent the first and second line segments, respectively;

aXyXz represents the interline angle between the lines Xy and Xz (FIG. 3);

dXyXz is the non-zero interline distance between the lines Xy and Xz, where Xy and Xz are non-intersecting (FIG. 4);

aTol is a prescribed interline angle tolerance threshold (FIG. 3); and dTol is a prescribed distance tolerance threshold (FIG. 4).

With respect to FIG. 3, to match intersecting line segments, the line segment 206-1 will be given the caption of line 'L1' and the line segment 206-2 the caption of line 'L2,' the line segment 207-1 the caption of line 'R1,' and the line segment 207-2 the caption of line 'R2.'

Once the line L1 is selected (block 301), all of the line segments 206 intersecting with the line L1 are considered a set of intersecting line segments CL1 (block 302). In this particular implementation, the line L2 that is different from L1 is selected from within CL1, and the set of line segments CL1 that does not include the line L2 is redefined as CL1' (block 303). The interline angle between L1 and L2, aL12, is measured (block 304). Next, lines R1 and R2 are selected in frame R such that an angle between them, aR12, is within a certain aTol of aL12 (block 305). If the angle aR12 is not within the certain aTol of the angle aL12, the method returns to block 301.

With the angle aR12 within the certain aTol of the angle aL12, a third line L3 is selected in CL1' (block 307). For the corresponding line R3, at least one matching condition is evaluated as illustrated below with respect to Equations 2 and 3 (block 308):

cond1: [abs($aR1R3-aL1L3$)<$a$Tol and abs
($aR2R3-aL2L3$)<$a$Tol]     (Equation 2)

cond2: [abs($aR2R3-aL1L3$)<$a$Tol and abs($aR1R3-aL2L3$)<$a$Tol]     (Equation 3)

When both of cond1 and cond2 are TRUE (block 309), the method 300 returns to block 301. Similarly, when both of cond1 and cond2 are FALSE (block 310), the method 300 returns to block 301. If the condition cond1 is TRUE (block 311), then R1 corresponds to L1 (block 312). If the condition cond2 is TRUE (block 313), then R2 corresponds to L1 (block 314).

In FIG. 4, for matching non-intersecting line segments, the line segment 206-1 will be given the caption of line 'L1' and the line segment 206-4 the caption of line 'L2,' the line segment 207-1 the caption of line 'R1,' and the line segment 207-4 the caption of line 'R2.' Once the line L1 is selected, all of the line segments 206 not intersecting with line L1 are considered a set of non-intersecting line segments CnL1 (block 401). The line L2 that is different from L1 is selected from within CnL1. In this particular implementation, the set of line segments CnL1 that does not include the line L2, is redefined as CnL1' (block 402). The interline distance between L1 and L2, dL12, is measured (block 403). Next, lines R1 and R2 are selected in frame R such that a distance between them, dR12, is within a certain dTol of dL12 (block 404). If the distance dR12 is not within the certain dTol of the distance dL12, the method returns to block 401.

With the distance dR12 within the certain dTol of the distance dL12, a third line L3 is selected in CnL1' (block 406).

For the corresponding line R3, at least one matching condition is evaluated as illustrated below with respect to Equations 4 and 5 (block 407):

cond3: [abs($dR1R3-dL1L3$)<$d$Tol and abs($dR2R3-dL2L3$)<$d$Tol]     (Equation 4)

cond4: [abs($dR2R3-dL1L3$)<$d$Tol and abs($dR1R3-dL2L3$)<$d$Tol]     (Equation 5)

When both of cond3 and cond4 are TRUE (block 408), the method 400 returns to block 401. Similarly, when both of cond3 and cond4 are FALSE (block 409), the method 400 returns to block 401. If the condition cond3 is TRUE (block 410), then R1 corresponds to L1 (block 411). If the condition cond4 is TRUE (block 412), then R2 corresponds to L1 (block 413).

Figure 5:
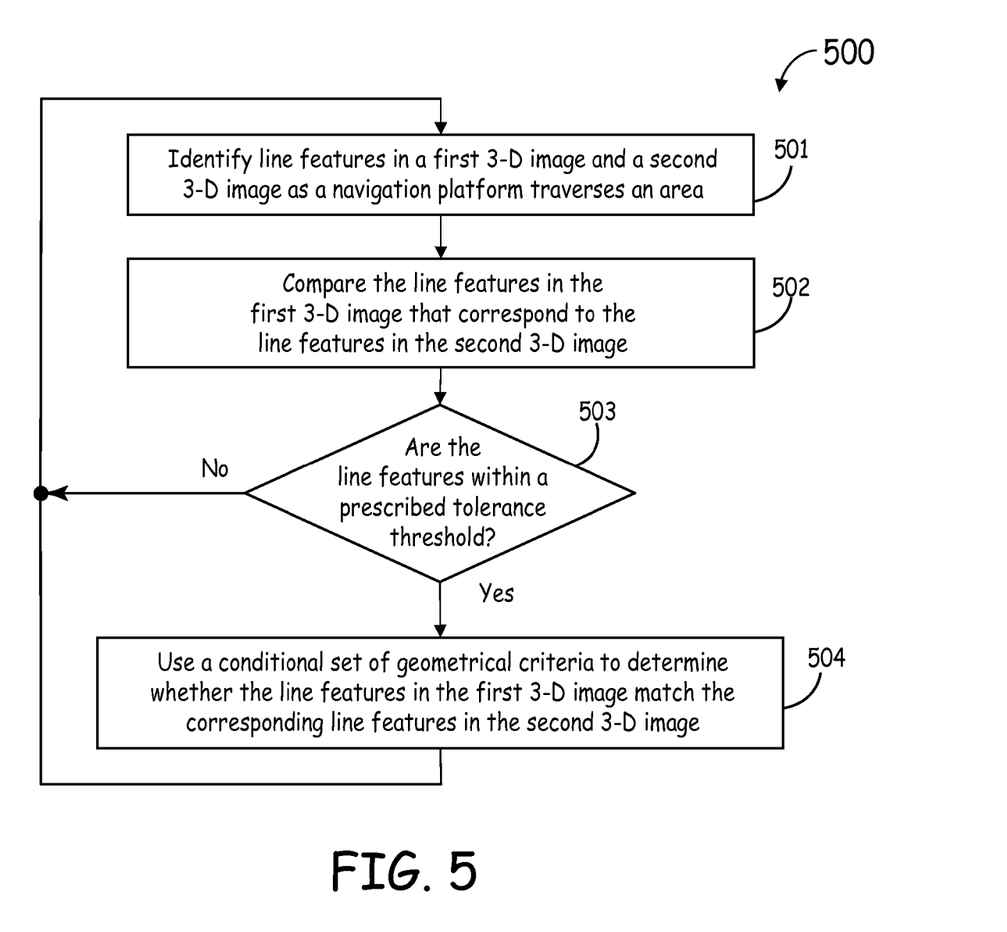
FIG. 5 is a flow diagram of an embodiment of a method for navigating.

FIG. 5 is a flow diagram of an embodiment of a method 500 for navigating. The method 500 addresses navigating in an area based on recording a plurality of 3-D images using various sensing elements from a navigation platform. In one embodiment, the navigation platform is an autonomous navigation platform that matches sets of line features from a plurality of sequential frames of the recorded images.

The method for navigating depicted in FIG. 5 identifies line features in a first 3-D image and a second 3-D image as a navigation platform traverses an area (block 501). In one implementation, the method 500 selects the line features comprising pairs of line segments in the first and the second 3-D images, where the first and second 3-D images are recorded over one or more frames by a sensor element on the navigation platform.

The method 500 compares the line features in the first 3-D image that correspond to the line features in the second 3-D image (block 502). In one implementation, the method 500 compares the line features by determining an interline angle measurement between at least two intersecting line segments. The at least two intersecting line segments are selected from the first image based on a projection of a first line segment of the at least two intersecting line segments on a plane passing through a second line segment of the at least two intersecting line segments, with the first intersecting line segment parallel to a projection of the second intersecting line segment. In a similar implementation, the method 500 compares the line features by determining an interline distance measurement between at least two non-intersecting line segments, the at least two non-intersecting line segments selected from the first image according to a Euclidean metric.

When the lines features compared in the first and the second 3-D images are within a prescribed tolerance threshold (block 503), the method 500 uses a conditional set of geometrical criteria to determine whether the line features in the first 3-D image match the corresponding line features in the second 3-D image (block 504). In one implementation, the method 500 determines whether an absolute difference of the corresponding line features, when using at least one additional line segment adjacent to the corresponding line features to link the corresponding line features between the first and the second 3-D images, is less than or equivalent to the prescribed tolerance threshold.

Figure 6:
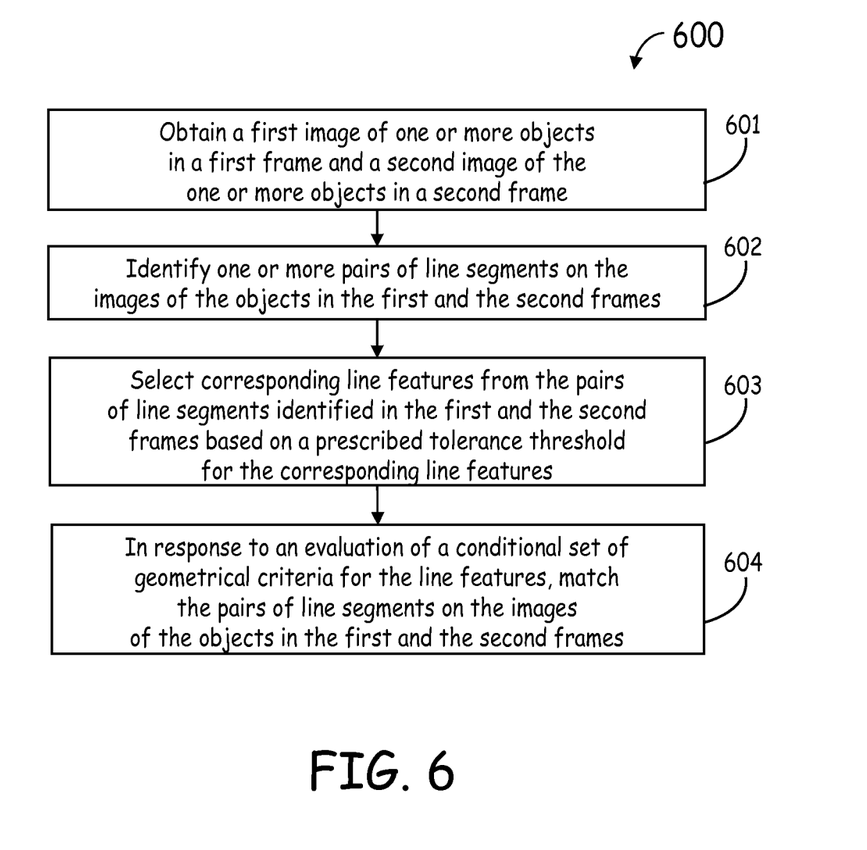
FIG. 6 is a flow diagram of an embodiment of a method for determining corresponding line features.

FIG. 6 is a flow diagram of an embodiment of a method 600 for determining corresponding line features. The method 600 addresses recognizing one or more objects using lines features from a plurality of 3-D images as recorded by a navigation platform. In particular, the method 600 obtains a first image of the objects in a first frame and a second image of the objects in a second frame (block 601). The method 600 then identifies one or more pairs of line segments on the images of the objects in the first frame and the second frame (block 602). From the identified pairs of line segments, the method 600 selects corresponding line features from the line segment pairs identified in the first and the second frames based on a prescribed tolerance threshold for the corresponding line features (block 603).

In one implementation, the method 600 selects a first line segment in the first frame from the one or more pairs of the line segments and determines whether one or more additional line segments in the first frame intersect with the first line segment for placement of the additional line segments in a set of intersecting line segments. Once a set of intersecting line segments is determined, the method 600 selects at least a second line segment from the set of intersecting line segments in the first frame and measures an interline angle between the first and the second line segments in the first frame. The method 600 selects a pair of corresponding line segments in the second frame corresponding to the interline angle measured in the first frame in response to an evaluation of a conditional set of geometrical criteria for the line features (for example, when an absolute difference of the interline angle between the selected line segments in the first frame and the corresponding line segment selections in the second frame is less than or equal to the prescribed tolerance threshold for the corresponding line features). In this particular implementation, the absolute difference of the interline angle is based in part on a third line segment adjacent to an area surrounding the pair of corresponding line segments.

In a similar implementation, the method 600 selects the first line segment in the first frame from the one or more pairs of the line segments and selects at least the second line segment from a set of non-intersecting line segments in the first frame. The method 600 then measures an interline distance between the first and the second line segments in the first frame. Next, the method 600 uses the interline distance to select a pair of corresponding line segments in the second frame corresponding to the interline distance measured in the first frame to evaluate the condition where an absolute difference of the interline distance between the selected line segments in the first frame and the corresponding line segment selections in the second frame is less than or equal to the prescribed tolerance threshold for the corresponding image features. Similar to the implementation discussed above, the absolute difference of the interline distance is based in part on the third line segment adjacent to the area surrounding the pair of corresponding line segments.

In response to the above-described evaluation(s) of conditional geometrical criteria for the line features, the method 600 matches the pairs of line segments on the images of the objects in the first and the second frames (block 604).

The methods and techniques described herein are suitable for use in a combination of digital electronic circuitry realized by hardware, executable modules stored on a computer readable medium, or a combination of both. At least one apparatus embodying these techniques includes appropriate input and output devices, a programmable processor, and a storage medium tangibly embodying program instructions for execution by the programmable processor. The programmable processor executing a program of instructions that operates on input data and generates appropriate output data performs a process embodying these techniques. These techniques are implemented in one or more programs that are executable on a programmable system including the programmable processor receiving data and instructions from (and transmitting data and instructions to) a data storage system, at least one input device, and at least one output device. Generally, the programmable processor receives instructions and data from at least one of a read only memory (ROM) and a random access memory (RAM). In addition, storage media suitable for tangibly embodying computer program product instructions and data include all forms of non-volatile memory, and include by way of example, semiconductor memory devices; magnetic disks such as internal hard disks and removable disks; magneto-optical discs; optical discs, and other computer-readable media. Any of the foregoing may be supplemented by, or incorporated in, specially designed application-specific integrated circuits (ASICs).

This description has been presented for purposes of illustration, and is not intended to be exhaustive or limited to the embodiments disclosed. Variations and modifications may occur, which fall within the scope of the following claims.

What is claimed is:

1. A method for navigating, the method comprising:
    identifying line features in a first three-dimensional (3-D) image and a second 3-D image as a navigation platform traverses an area;
    comparing the line features in the first 3-D image that correspond to the line features in the second 3-D image, wherein comparing the line features comprises:
        determining an interline angle measurement between at least two intersecting line segments, the at least two intersecting line segments selected from the first 3-D image based on a projection of a first line segment of the at least two intersecting line segments on a plane passing through a second line segment of the at least two intersecting line segments and parallel to the first line segment; or
        determining an interline distance measurement between at least two non-intersecting line segments, the at least two non-intersecting line segments selected from the first 3-D image according to a Euclidean metric; and
    when the line features compared in the first and the second 3-D images are within a prescribed tolerance threshold, using a conditional set of geometrical criteria to determine whether the line features in the first 3-D image match the corresponding line features in the second 3-D image.

2. The method of claim 1, wherein identifying the line features comprises selecting the line features comprising pairs of line segments in the first and the second 3-D images, the first and second 3-D images recorded over one or more frames by a sensor element on the navigation platform.

3. The method of claim 1, wherein using the conditional set of geometrical criteria comprises determining whether an absolute difference of the corresponding line features, when using at least one additional line segment adjacent to the corresponding line features to link the corresponding line features between the first and the second 3-D images, is less than or equivalent to the prescribed tolerance threshold.

4. A computer program product comprising:
    a non-transitory computer-readable storage medium having executable instructions for implementing a method for navigating comprising:
        identifying line features in a first three-dimensional (3-D) image and a second 3-D image as a navigation platform traverses an area;
        comparing the line features in the first 3-D image that correspond to the line features in the second 3-D image; and
        when the line features compared in the first and the second 3-D images are within a prescribed tolerance threshold, using a conditional set of geometrical criteria to determine whether the line features in the first 3-D image match the corresponding line features in the second 3-D image, wherein using the conditional set of geometrical criteria comprises determining whether an absolute difference of the corresponding line features, when using at least one additional line segment adjacent to the corresponding line features to link the corresponding line features between the first and the second 3-D images, is less than or equivalent to the prescribed tolerance threshold.

5. A system for navigation, comprising:
    a sensor element operable to measure line features on a plurality of three-dimensional (3-D) images of an area in a field of view of the sensor element within a first frame at a first time and within at least one second frame at a second time; and
    a processing unit coupled to the sensor element, the processing unit configured to record and compare the line features from the first and second frames of the 3-D images as the system traverses the area, the processing unit further configured to:
        select, within a prescribed tolerance threshold, at least one corresponding line feature between the first and the second frames;
        match the line features from the first frame with each of the corresponding line features in the second frame using at least one of an interline angle or an interline distance between at least two line segments recorded in the plurality of 3-D images; and
        use a conditional set of geometrical criteria to determine whether the at least one corresponding line feature in the first frame matches with the selection made from the second frame;
    wherein the processing unit is further configured to:
        compare the line features of the first and the second frames recorded by the sensor element to determine the interline angle between at least two intersecting line segments, the at least two intersecting line segments selected from the first frame based on a projection of a first line segment of the at least two intersecting line segments on a plane passing through a second line segment of the at least two intersecting line segments and parallel to the first line segment; or
        compare the line features of the first and the second frames recorded by the sensor element to determine the interline distance between at least two non-intersecting line segments, the at least two non-intersecting line segments selected from the first frame according to a Euclidean metric.

6. The system of claim 5, further comprising:
    an inertial measurement unit (IMU) communicatively coupled to the processing unit, the IMU operable to obtain navigational data of the 3-D images at the first and second times.

7. The system of claim 6, wherein the processing unit is configured to:
    identify a first line feature in the first frame based on signals received from the sensor element;
    select at least one second line feature corresponding to the first line feature in the second frame based on the motion data from the IMU; and
    evaluate the first and the second frames to match the at least one corresponding line feature selected in the second frame.

8. The system of claim 5, wherein the sensor element is one of a range finder, a ladar, a millimeter wave radar, a stereo camera, or a vision sensor.

9. The system of claim 5, further comprising:
a navigation-aiding sensor in operative communication with the processing unit, the navigation-aiding sensor one of a global positioning system sensor, a magnetometer, a barometric altimeter, a Doppler radar, or an odometer.

10. The system of claim 5, further comprising:
an output terminal in operative communication with the processing unit, the output terminal configured to:
  display the recorded line features for any objects present in the field of view of the sensor element; and
  display the current state and position of the navigation system based on signals received from the processing unit.

11. The system of claim 5, further comprising:
a memory unit in operative communication with the processing unit, the memory unit configured to:
  store a database of 3-D images based on the navigational data obtained during at least one of the first and second times by the processing unit; and
  record navigational properties of the corresponding line features to update the database of 3-D images based on the navigational data obtained during the at least one of the first and second times.

* * * * *